(No Model.)
F. N. KELSEY.
BRAKE HANDLE.
No. 532,670. Patented Jan. 15, 1895.
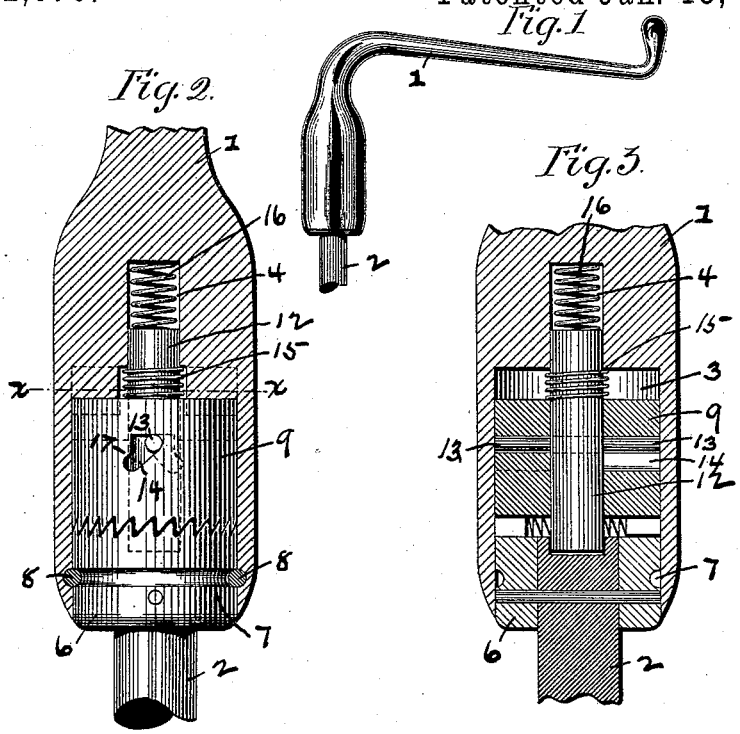
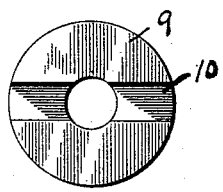
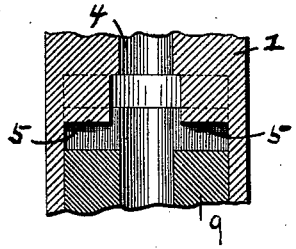
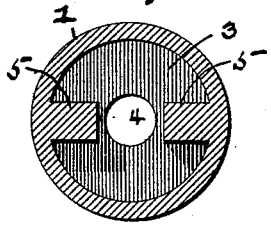
Witnesses:
Chas. B. Shumway
J. E. Chapman
Inventor
Frank N. Kelsey
By Wm. H. Chapman
Attorney

UNITED STATES PATENT OFFICE.

FRANK N. KELSEY, OF NEW HAVEN, CONNECTICUT, ASSIGNOR OF ONE-THIRD TO CHARLES L. WRIGHT, OF SAME PLACE.

BRAKE-HANDLE.

SPECIFICATION forming part of Letters Patent No. 532,670, dated January 15, 1895.

Application filed August 29, 1894. Serial No. 521,603. (No model.)

*To all whom it may concern:*

Be it known that I, FRANK N. KELSEY, a citizen of the United States, residing at New Haven, county of New Haven, and State of Connecticut, have invented a new and useful Improvement in Ratchet-Brakes, of which the following is a specification, reference being had to the accompanying drawings, forming part thereof.

My invention relates to the ratchet brakes used on electric and other street cars, and it has for its object to provide a brake of this nature which will be entirely noiseless in the backward movement of the brake handle and will, at the same time, possess all of the strength and durability for braking purposes of the ordinary ratchet brake.

A further object is to provide means whereby my invention can be quickly and readily applied to the brakes now in use.

To these ends my invention consists in the ratchet brake constructed and operating as hereinafter fully described and particularly pointed out in the claims.

Referring to the drawings, in which like numerals designate like parts in the several views, Figure 1 is a view of the brake handle. Fig. 2 is a vertical section of the handle socket and a side view of the two clutch members. Fig. 3 is a vertical section of the handle socket and the two clutch members, the same being turned one-fourth of a revolution from the position shown in Fig. 2. Fig. 4 is a plan view of the upper clutch member. Fig. 5 is an inverted cross-section of the handle socket, taken at the point *x—x* in Fig. 2. Fig. 6 is a partial vertical section of the handle socket and the upper clutch member standing in the position shown in Fig. 2.

The numeral 1 designates the brake handle which is or may be of the usual shape, and 2 designates the brake-rod or shaft to the upper end of which said handle is connected by the clutch mechanism presently to be described.

The handle 1 is provided with the socket 3 extending inwardly from its lower end, and has at the inner end of said socket the recess 4 which, when the parts are assembled, is in line with the axis of the rod 2; also located at the inner end of said socket 3 are the two oppositely located lugs 5 5, which project downwardly within the socket as shown in Figs. 5 and 6. The clutch proper is composed of two members, of which the lower member 6 is pinned fast to the rod or shaft 2, as shown in Fig. 3, said member being provided with ratchet teeth on its upper end, and with an annular groove 7 near its lower end to receive the pins 8, passed through holes near the lower end of the handle socket, whereby the said socket is held against endwise movement upon said member while being free to revolve independently thereof. The upper clutch member 9 has a central bore extending through it of substantially the diameter of the recess 4 in the socket, has ratchet teeth on its lower end corresponding to those on the lower member, and is provided at its upper end with a recess 10 extending diametrically across it to receive the lugs 5 on the handle socket, whereby it is compelled to revolve with the latter but is free to have a limited endwise movement independently thereof.

In this class of brakes as heretofore constructed it has been customary to continue the rod or shaft 2 upwardly through the upper clutch member to form a bearing for the latter, and to interpose a spring between the upper member and the upper end of the socket in the handle, whereby the upper member is free to rise in the backward movement of the handle and allow its teeth to ride over those of the lower member, the spring causing it to again drop into operative engagement with the teeth of the lower member when such backward movement ceases. Such reverse riding movement of the teeth over each other results in a very pronounced and disagreeable noise and also in considerable wear of the teeth, and it is to avoid these objections that my invention is designed.

In the practice of my invention I provide means for mechanically imparting to the upper clutch member a slight additional upward movement after it has reached the highest point to which it is raised by the inclined faces of the teeth in the backward movement of the handle, so that the teeth of the two members will entirely clear each other, and for holding it in such elevated position so long as the backward movement of the handle continues, the upper member again falling into operative engagement with the lower member as soon as such movement ceases. Various forms of devices for mechanically securing such result can be utilized within the scope of my invention, but I have herein illustrated the form which I prefer to use because of its comparative cheapness and the ease with which it can be applied to ratchet brakes already in use, the same being constructed and operated as follows:

The brake-rod or shaft terminates at its upper end substantially flush with the upper end of the lower clutch member 6, and in the upper end of said rod or shaft 2 I form a recess to receive the lower end of a short supplemental rod or shaft 12, which passes upwardly through the upper clutch member 9 into the recess 4 in the handle, said rod or shaft 12 being thus free to revolve independently of the rod or shaft 2. From opposite sides of said supplemental rod project two pins 13, which enter openings 14 in the upper clutch member, the lower wall of which openings is or may be inclined as shown to correspond with the pitch of the teeth of the two members, and the upper wall of which extends for a short distance from the lower end of the opening at a similar inclination, and from thence extends vertically or parallel with the axis of the rod 12 to the upper end of the opening, thus forming a shoulder 17 at the point of meeting of said inclined and vertical portions thereof, the entire length of said openings from top to bottom being slightly greater than the length of the teeth of the two members. A spring 15 surrounds the rod 12 between the upper clutch member and the upper end of the socket 3 in the handle, and a spring 16 of greater stiffness is interposed between the upper end of said rod and the end of the recess 4. The teeth of the two members of the ratchet preferably have their ends slightly rounded as shown.

The parts being assembled as shown in Figs. 2 and 3, and the upper clutch member occupying its lowest position in which it is normally retained by its spring 15, if the brake handle be turned toward the right all of the parts will revolve in unison to set the brakes on the car. If the brake handle be turned in the opposite direction or toward the left, the inclined edges of the ratchet teeth will cause the upper member to rise in the usual manner, and, the rod 12 being prevented from participating in the revolving movement of said member by its spring 16, its pins 13 are caused to travel from the upper toward the lower end of the opening 14 in said member, arriving beneath the shoulders 17 at the instant at which the two clutch members reach the greatest point of separation which their teeth are capable of imparting to them. Said pins by engaging said shoulders 17 then support the weight of the upper clutch member and, by their slightly continued movement against the inclined upper wall of the openings, 14, raise said member until its teeth are entirely out of engagement with those of the lower member. As soon as said pins reach the lower end of the openings 14 the rod 12 and the upper clutch member move as one with the handle during the remainder of its backward movement, the drag exerted upon said rod by its spring 16 however, still causing it to maintain said clutch member in its highest position. As soon as the backward movement of the handle ceases the spring 15 immediately returns the upper clutch member to its lowest position where it is in operative engagement with the lower member as before. By slightly rounding the ends of the ratchet teeth as described they are caused to infallibly guide the two members into a locked engagement in such return movement of the upper member, regardless of the particular point at which said teeth first engage each other. It will be seen that, the teeth being thus positively held out of engagement with each other during the backward movement of the handle, the brake is entirely noiseless in such movement, and the teeth are saved from all wear, except that which results from their engagement with each other in the forward movement of the handle.

Attention is also called to the fact that the embodiment of my invention herein shown and described can be readily applied to ratchet brakes now in use at a comparatively slight cost.

Believing myself to be the first to provide a ratchet brake with means for mechanically raising the movable clutch member entirely out of engagement with the opposite member during the backward movement of the brake handle, I do not wish to restrict myself to the exact means for securing such result herein shown and described.

Having thus fully described my invention, what I claim, and desire to secure by Letters Patent, is—

1. In a ratchet brake, the combination with the brake rod or shaft and the brake handle, of two clutch members provided with complementary ratchet teeth one of which members is carried by said rod or shaft and the other by said brake handle, and means for entirely separating said clutch members from each other during the backward movement of said handle, substantially as described.

2. In a ratchet brake, the combination with the brake rod or shaft and the brake handle, of a toothed clutch member secured to said rod or shaft, a similar clutch member mounted in said handle and capable of a limited endwise movement therein, and means for automatically moving said latter clutch member, when the handle is turned rearwardly, to a position in which its teeth entirely clear those of the opposite member, substantially as described.

3. In a ratchet brake, the combination with the brake rod or shaft and a brake handle having a socket at its lower end, of a toothed clutch member secured to said rod or shaft, a similar clutch member located in the socket in said handle and capable of a limited endwise movement therein, and intermediate connections between said handle and said latter clutch member whereby an initial backward movement of the former will raise the latter entirely out of engagement with the opposite clutch member, substantially as and for the purpose set forth.

4. In a ratchet brake, the combination with the brake rod or shaft, the brake handle, and two toothed clutch members carried by said rod or shaft and handle respectively the teeth of one of which members rise upon the teeth of the opposite member when the handle is turned in a rearward direction, of means on said handle for engaging said upwardly movable clutch member when it reaches the highest point to which it can be raised by said teeth and imparting a slight additional upward movement thereto and holding it in such position while said rearward movement of the handle continues, substantially in the manner and for the purpose set forth.

5. In a ratchet brake, a lower clutch member fixed to the brake rod or shaft, a brake handle having a socket at its lower end, an upper clutch member located within the socket in said handle and capable of a limited endwise movement therein, a supplemental rod or shaft passing through said upper clutch member and having projecting therefrom an engaging device which enters an inclined opening in the latter, and means for holding said supplemental rod or shaft from rotation when its engaging device is out of contact with the walls of the opening in said clutch member, combined and operating substantially as described.

6. In a ratchet brake, the combination with the brake rod or shaft and the brake handle having a socket at its lower end, of two clutch members provided with complementary ratchet teeth one of which members is fixed to said rod or shaft and the other of which is secured within the socket in said handle in such manner as to be capable of a limited endwise movement therein, said latter clutch member being provided with two oppositely located openings the upper wall of which forms a shoulder and an inclined way below said shoulder as described, a supplementary rod or shaft passing through the clutch member in said handle and having oppositely located pins projecting within the openings in the latter, a spring exerting downward pressure upon said latter clutch member, and means for exerting friction upon said supplemental rod or shaft to prevent rotation thereof except when it is positively moved by the contact of its pins with the walls of the openings in said clutch member, substantially as described.

7. In a ratchet brake, the combination with rod or shaft 2 and handle 1, of the lower clutch member 6 and upper clutch member 9 the latter having therein the openings 14 and shoulders 17, supplemental rod 12 having the pins 13, and springs 15 and 16, arranged and operating substantially as described.

FRANK N. KELSEY.

Witnesses:
W. H. CHAPMAN,
EDWIN C. DOW.